US012459753B2

(12) United States Patent
Del Fabro

(10) Patent No.: US 12,459,753 B2
(45) Date of Patent: Nov. 4, 2025

(54) APPARATUS AND METHOD TO STORE BARS

(71) Applicant: M.E.P. MACCHINE ELETTRONICHE PIEGATRICI S.P.A., Reana del Rojale (IT)

(72) Inventor: Giorgio Del Fabro, Udine (IT)

(73) Assignee: M.E.P. MACCHINE ELETTRONICHE PIERGATRICI S.P.A., Reana del Rojale (IT)

( * ) Notice: Subject to any disclaimer, the term of this patent is extended or adjusted under 35 U.S.C. 154(b) by 925 days.

(21) Appl. No.: 17/638,260

(22) PCT Filed: Aug. 20, 2020

(86) PCT No.: PCT/IT2020/050207
§ 371 (c)(1),
(2) Date: Feb. 25, 2022

(87) PCT Pub. No.: WO2021/038608
PCT Pub. Date: Mar. 4, 2021

(65) Prior Publication Data
US 2022/0348416 A1    Nov. 3, 2022

(30) Foreign Application Priority Data
Aug. 28, 2019   (IT) .......... 102019000015165

(51) Int. Cl.
*B65G 47/14*    (2006.01)
*B65G 1/04*    (2006.01)
*B65G 1/10*    (2006.01)

(52) U.S. Cl.
CPC ....... *B65G 47/1414* (2013.01); *B65G 1/0442* (2013.01); *B65G 1/10* (2013.01); *B65G 2201/0217* (2013.01)

(58) Field of Classification Search
CPC .............. B65G 1/10; B65G 1/0442; B65G 2201/0217; B65G 47/1414
See application file for complete search history.

(56) References Cited

U.S. PATENT DOCUMENTS 5,427,490 A * 6/1995 Tokiwa ................ B65G 1/0442
414/280

FOREIGN PATENT DOCUMENTS

| DE | 4142355 A1 | 6/1993 |
| WO | 2014045242 A1 | 3/2014 |
| WO | 2017216085 A1 | 12/2017 |
| WO | 2019123506 A1 | 6/2019 |

OTHER PUBLICATIONS

PCT International Search Report and Written Opinion for PCT Patent Application No. PCT/IT2020/050207 dated Jan. 12, 2021. 9 Pages.

* cited by examiner

*Primary Examiner* — Saul Rodriguez
*Assistant Examiner* — Willie W Berry, Jr.
(74) *Attorney, Agent, or Firm* — McAndrews, Held & Malloy, Ltd.

(57) ABSTRACT

Apparatus to store bars (B) comprising a support plane (11), a bundle feed zone (12) and a bar delivery zone (13) associated with respective opposite ends of the support plane (11), wherein the support plane (11) comprises a unit (14) to move the bars (B) in a direction of movement (Z) at least from the bundle feed zone (12) to the bar delivery zone (13).

13 Claims, 11 Drawing Sheets

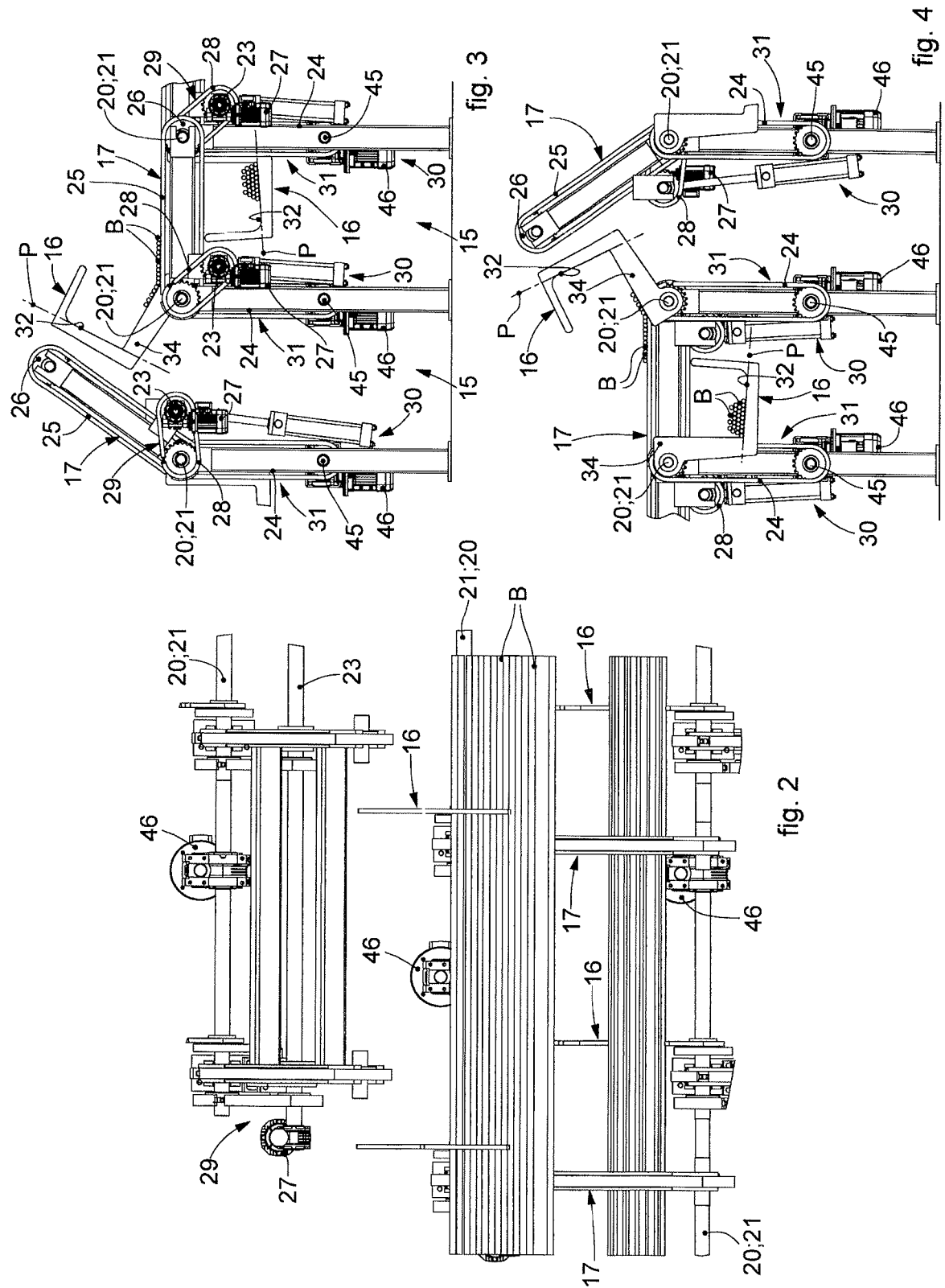

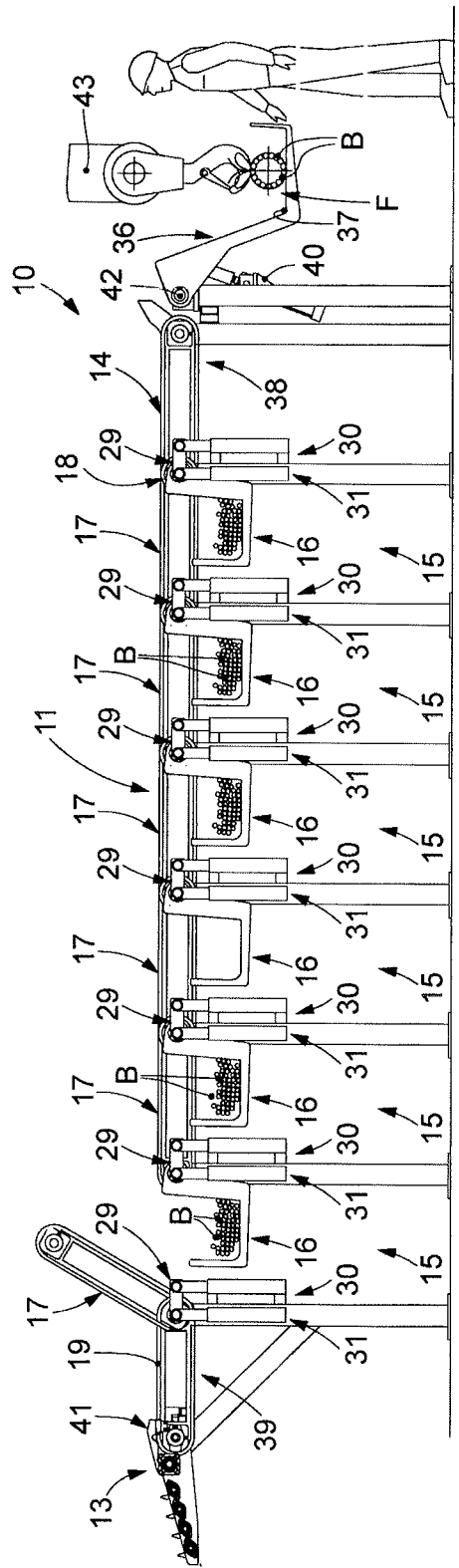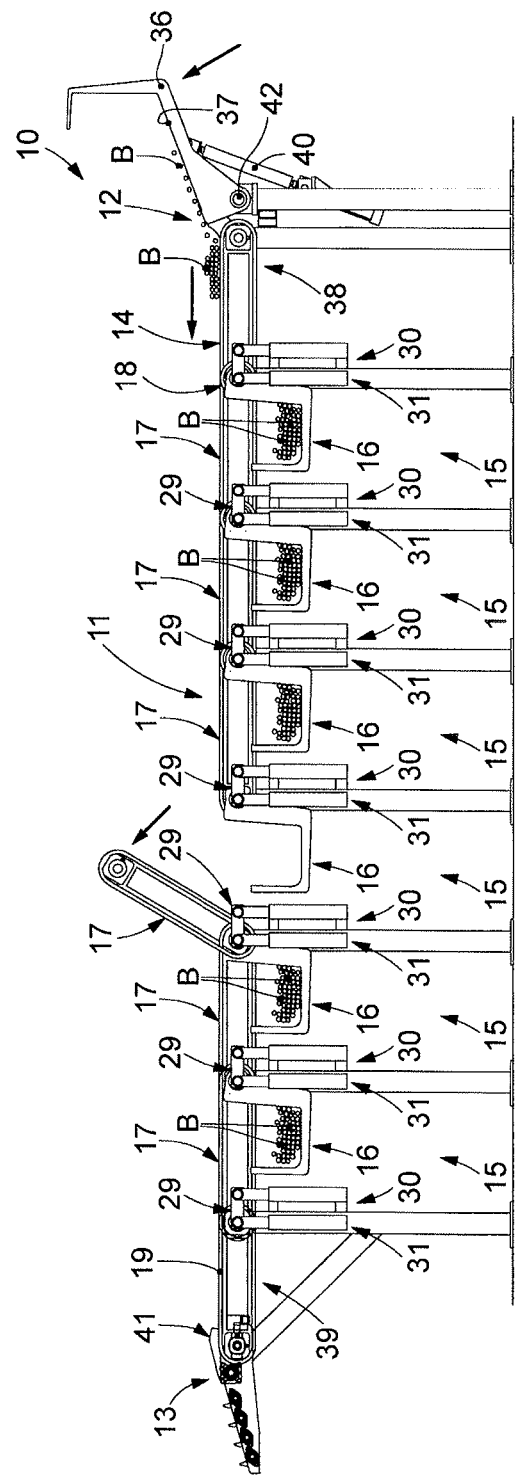

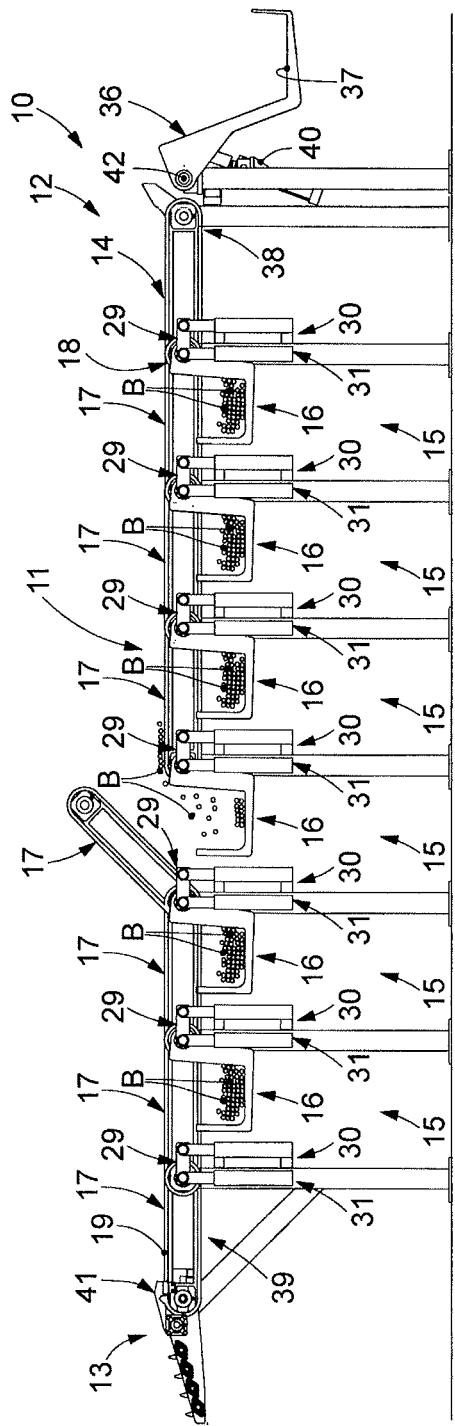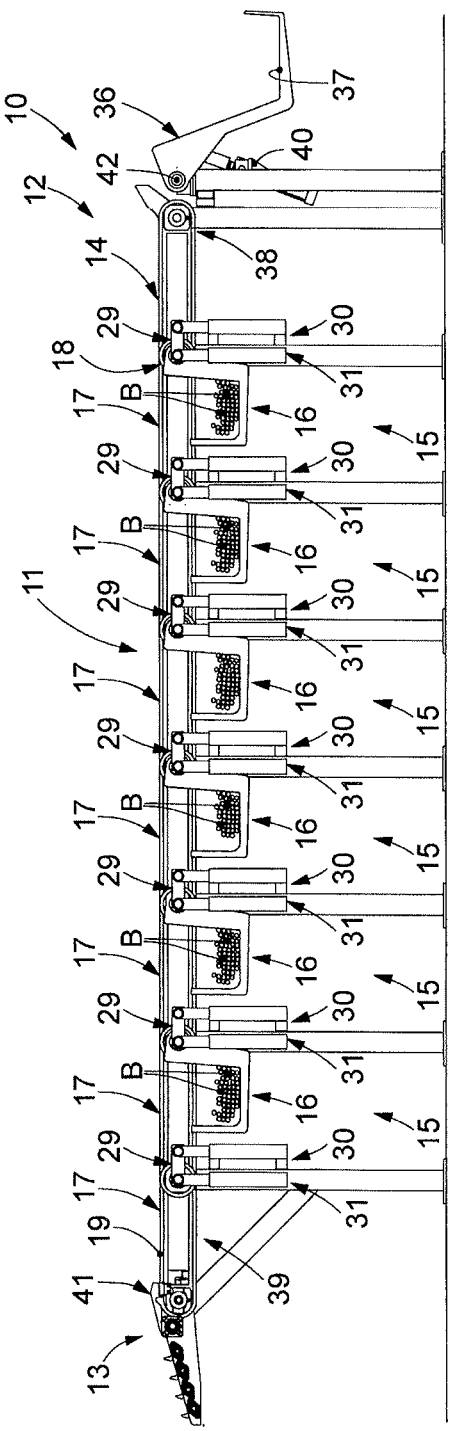

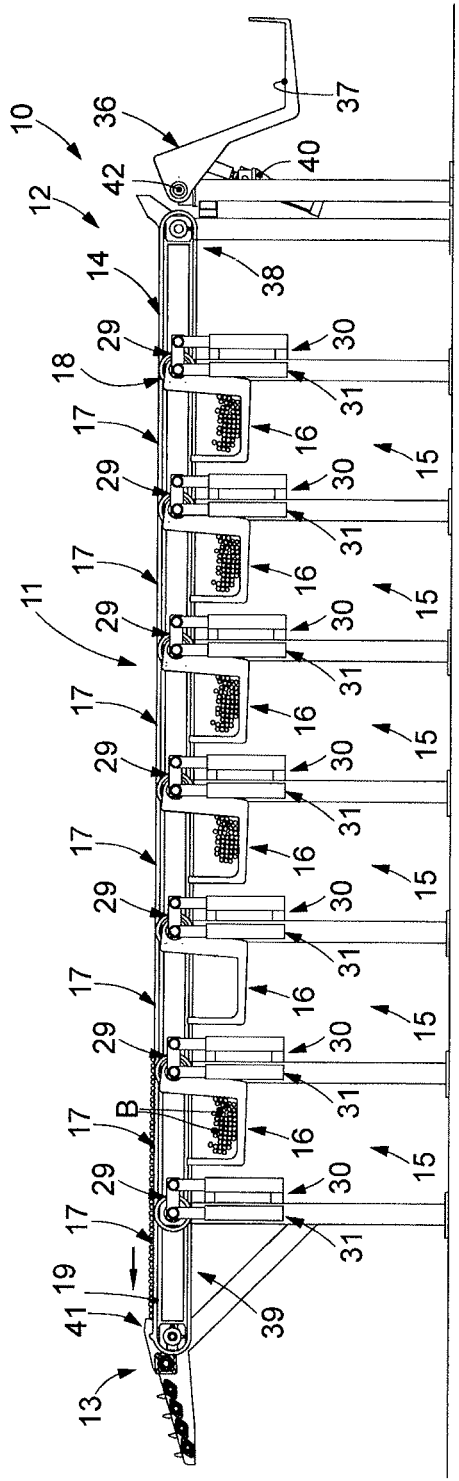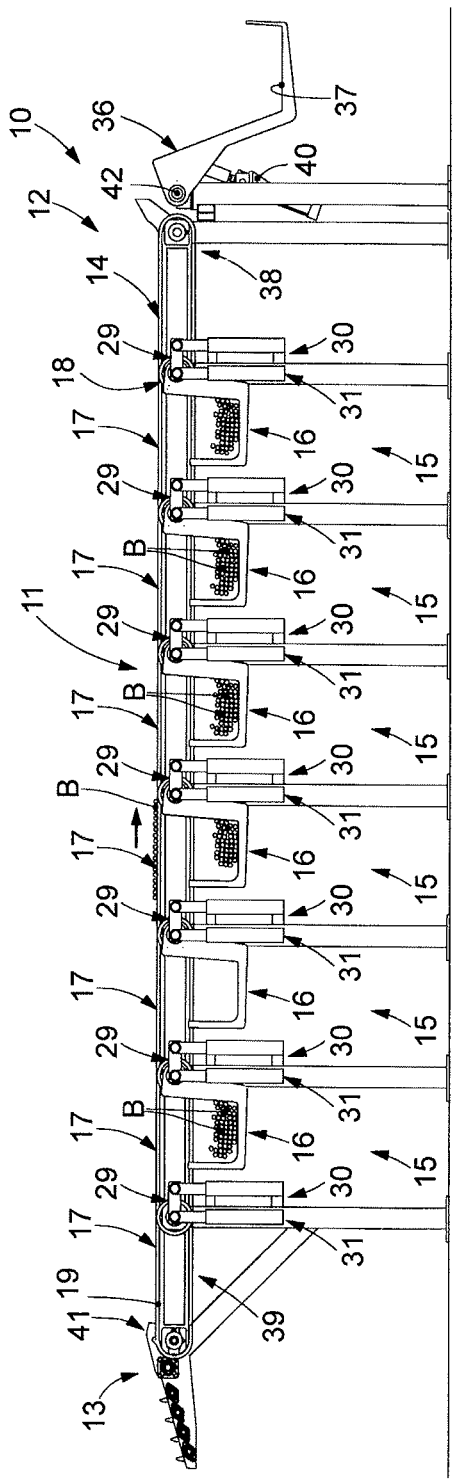

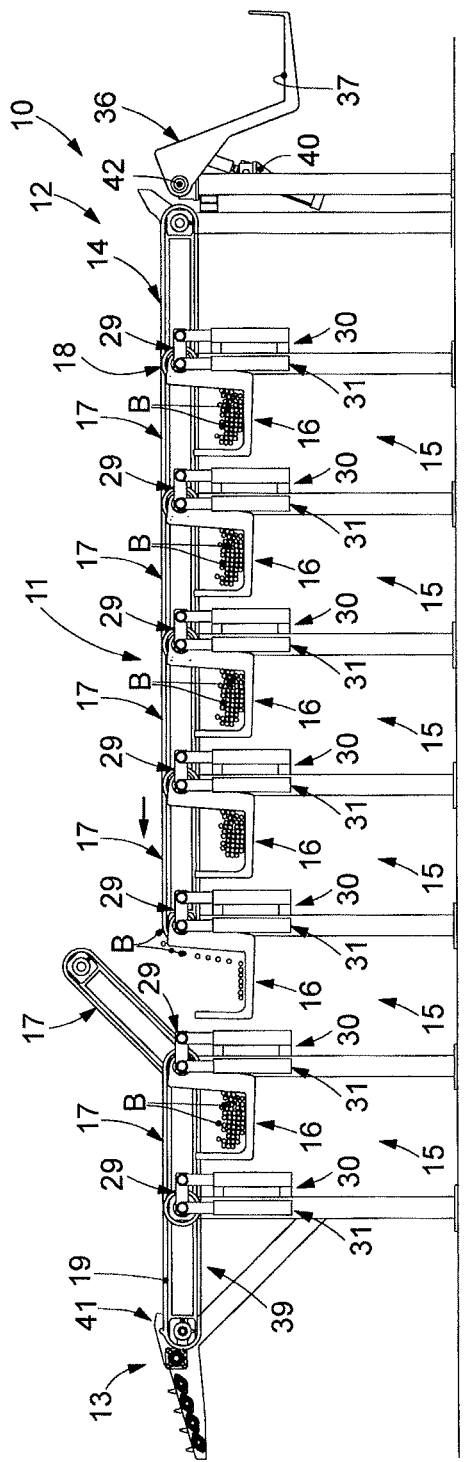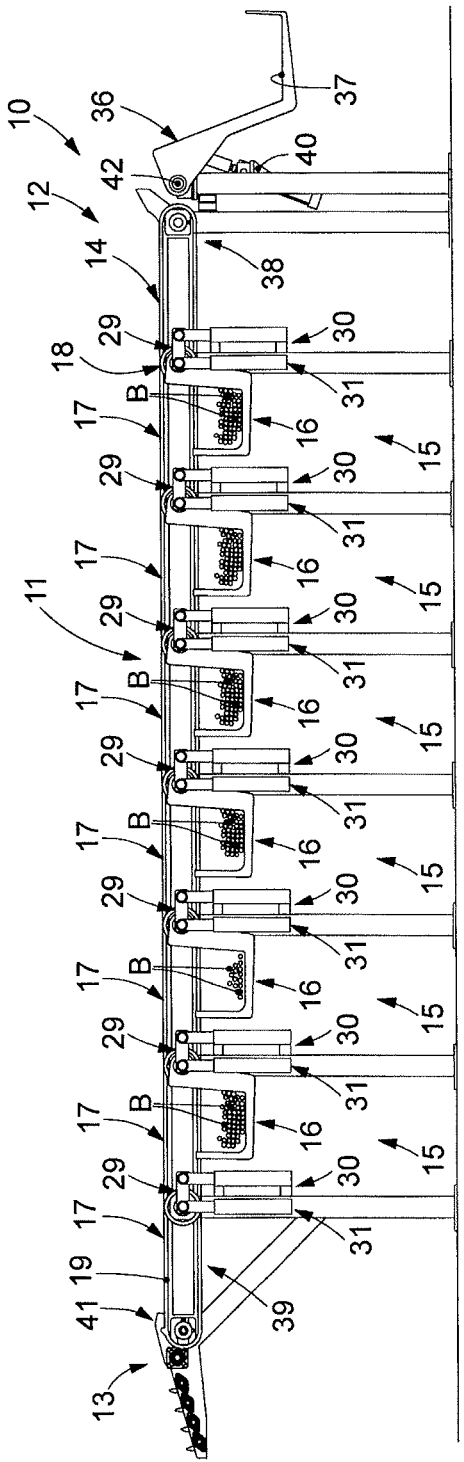

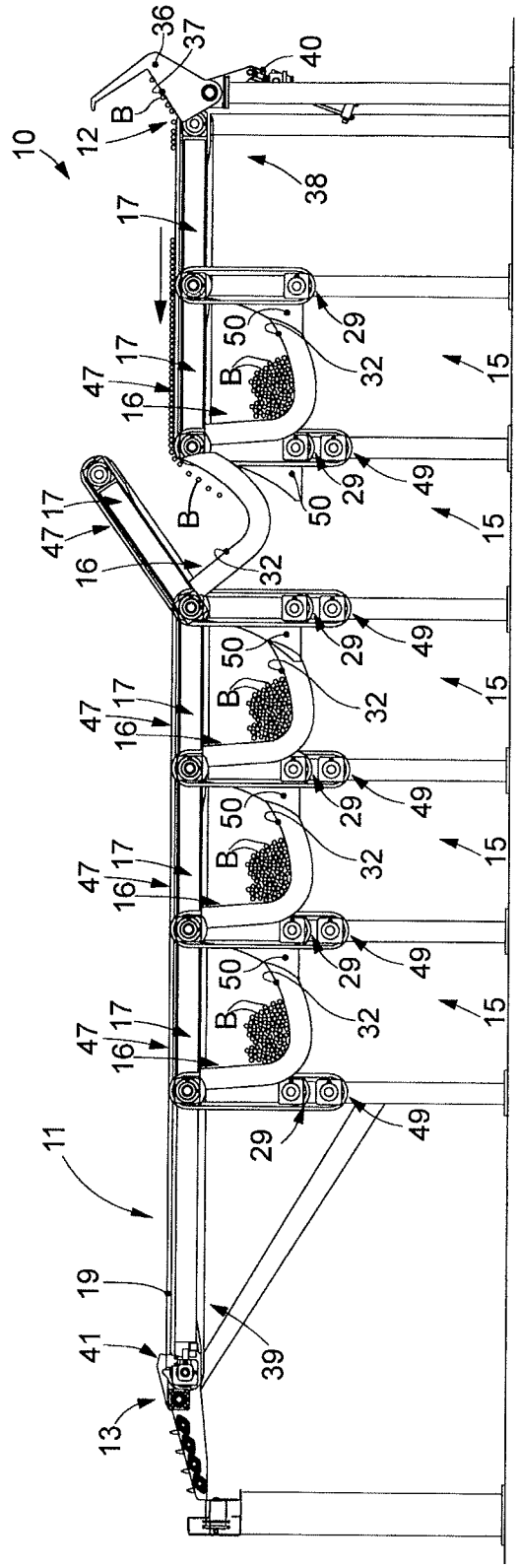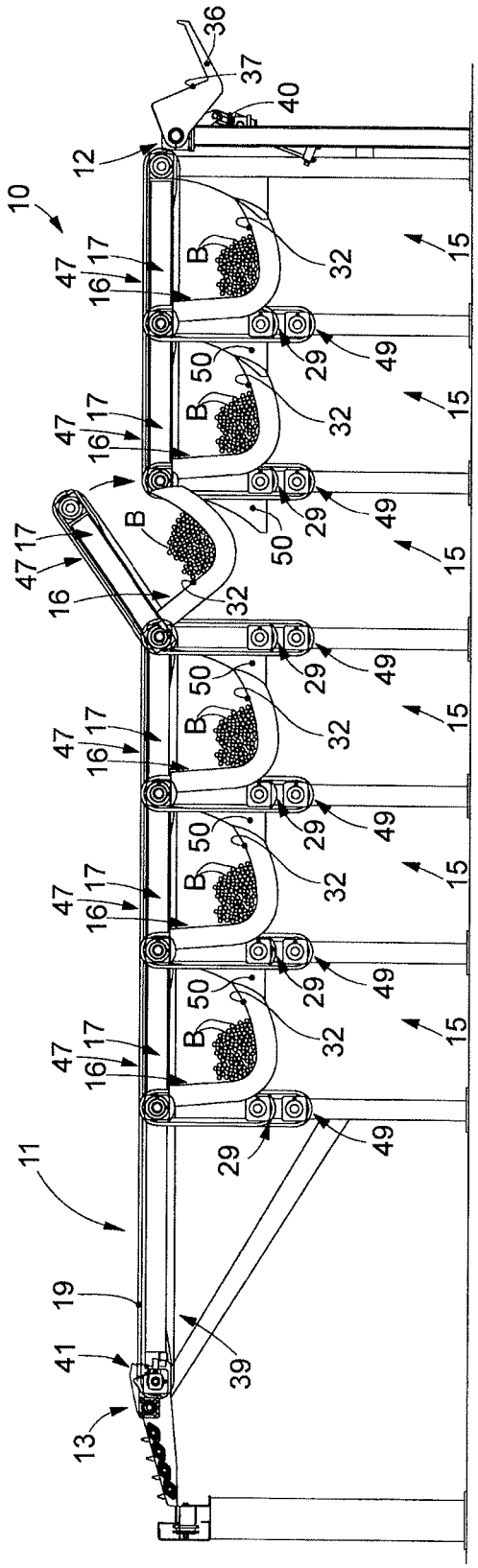

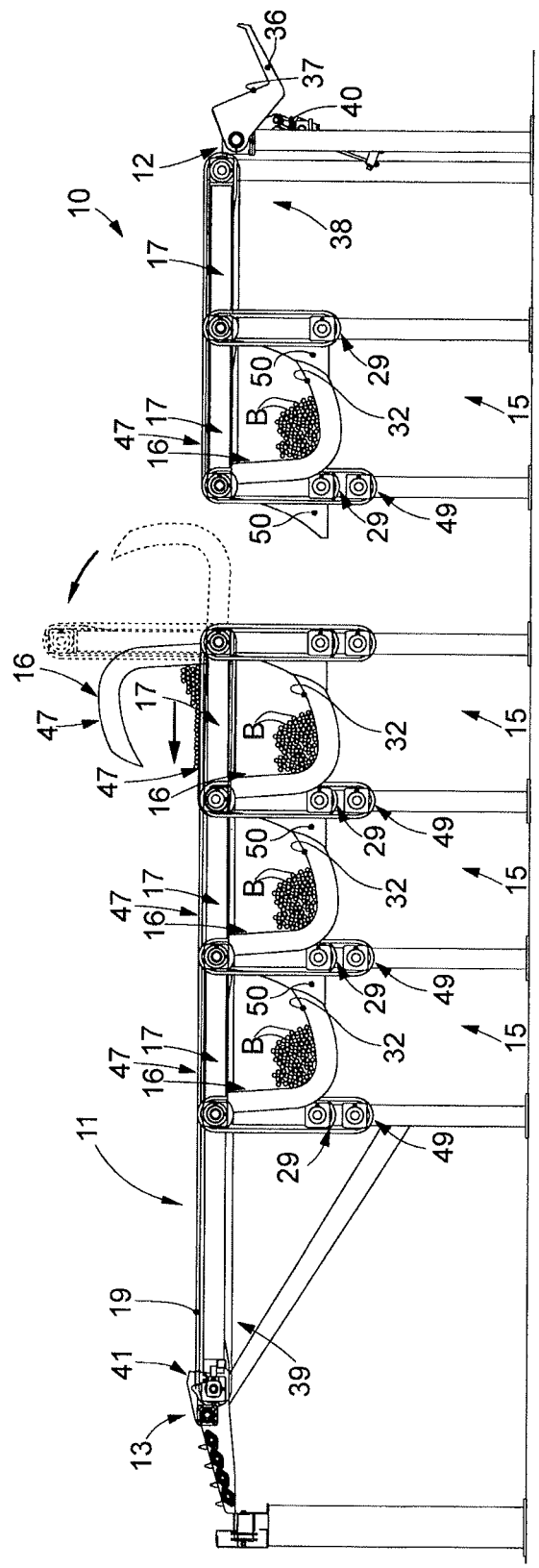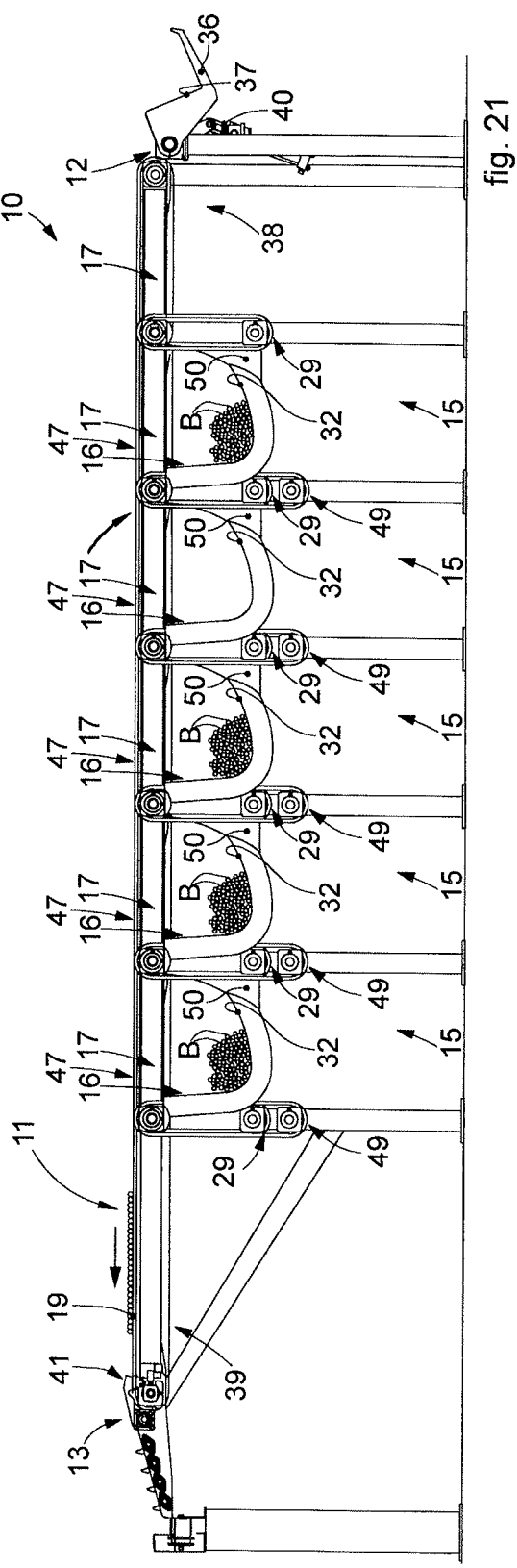

APPARATUS AND METHOD TO STORE BARS

CROSS-REFERENCE TO RELATED APPLICATIONS

This application is a national stage application of International Application No. PCT/IT2020/050207, having an International filing date of Aug. 20, 2020, which claims priority to Italy Application No. 102019000015165, filed Aug. 28, 2019. The entire disclosures of the aforesaid applications are incorporated herein by reference.

FIELD OF THE INVENTION

The present invention concerns an apparatus and a method to store bars, in particular bars grouped in bundles.

In particular, the present invention can be used to receive a specific bundle from a warehouse of bundles of bars, and subsequently to store the bars of the bundle in a homogeneous way, for example according to diameter or other characteristic, while waiting to supply them, in correspondence with a delivery zone, to one or more user machines located downstream.

By the term bars we generally mean oblong-shaped products such as wire rod, reinforcement bars, round pieces, square pieces, or suchlike, having a circular, polygonal or flat cross-sectional shape.

BACKGROUND OF THE INVENTION

It is known to feed bars to user machines such as bending machines, stirrup making machines, welding machines, cutting or counting plants or other.

Especially in the case of cutting or bar counting plants, it is known to take the bars by means of bridge cranes, cranes or suchlike from suitable warehouses, or directly from the transport means, and supply them to a feed station which feeds the plants as above.

Depending on the final product to be obtained, the bars to be supplied to the user machine can be of different types, for example of different diameter, material, shape, surface working or other. One of the main problems that makes it difficult and complex to move them is that the bars can have very long lengths, even up to 30 m and more, they tend to bend due to their weight and to twist together due to their oblong conformation.

To at least partly obviate this, each type of bar is normally supplied in bundles, so that a first bundle can be formed by bars of a first type, a second bundle by a second type, and so on.

On each occasion, each bundle of bars is picked up by a bridge crane from the corresponding warehouse in which it is located, or from the means of transport, and delivered to the feed station. The feed station can be provided with a feed plane on which the bundle is positioned. The feed plane allows the bars to be scattered with respect to each other, so as to be subsequently picked up and fed to the user machine by means of one or more handling devices associated with the support plane.

Once the execution of a certain range of products by the user machine has finished, the remaining bars scattered on the feed plane are reassembled and tied to form a new bundle of residual bars. This new bundle is picked up by the bridge crane and returned to the warehouse.

With the bridge crane, another bundle of bars is picked up, for example of a different type, transferred to the feed plane and the cycle restarts as before.

The procedure for transferring the bars from the warehouse to the feed plane, and vice versa, is therefore extremely complex as it requires the use of dedicated structures, as well as the presence of operators to guide and appropriately position, on each occasion, the movement of the bars from the warehouse to the work plane.

This operation to vary the type of bars, moreover, can also be very expensive in terms of time and can also cause downtimes of the user machines located downstream of the supply apparatus considered.

There is therefore a need to perfect an apparatus to store bars that can overcome at least one of the disadvantages of the state of the art.

In particular, one purpose of the present invention is to provide an apparatus to store bars that allows to store bars, fed in the form of bundles, in an orderly, quick and efficient manner.

Another purpose of the present invention is to provide a fully automated apparatus to store bars, that is, that requires a limited number of operators to manage it.

Another purpose of the present invention is to provide an apparatus to store bars that allows the bars to be supplied to user machines located downstream, for example to a cutting plant, avoiding machine downtimes to allow the operations to change the bar format.

Another purpose is to perfect a method to store bars that allows an efficient and automated management of the movement of the bars between the warehouse and the user machine.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the apparatus to store bars, according to the present invention, comprises a support plane, a bundle feed zone and a bar delivery zone associated with respective opposite ends of the support plane.

The support plane comprises a unit to move the bars in a direction of movement at least from the bundle feed zone to the bar delivery zone as above.

In accordance with one aspect of the present invention, the apparatus to store bars comprises a plurality of containing and translation units disposed adjacent to each other with respect to the direction of movement.

Each containing and translation unit comprises:
at least two containing elements distanced and aligned in a longitudinal direction, transverse to the direction of movement, coordinated with each other and selectively movable in order to pass at least from one containing position, in which they are positioned below the support plane and are suitable to support a respective bundle of bars, to at least one release position, in which they are positioned above the support plane in order to release the bars onto the support plane;
at least two movement devices positioned in correspondence with the containing elements and aligned in the longitudinal direction in an offset position with respect to the containing elements, coordinated with each other in order to pass at least from one lowered condition, in which they are parallel to the support plane and allow the movement of the bars, to at least one raised condition in which they are raised in order to allow access to the respective containing elements.

In accordance with some embodiments, the movement devices can be separate and autonomous components with respect to the respective containing elements, wherein the movement devices are mobile independently of the respective containing elements in order to independently pass respectively from the lowered condition to the raised condition, and from the containing position to the release position, possibly through respective intermediate conditions and positions.

In accordance with another embodiment, each movement device, together with the respective containing element, can constitute a single movement body mobile in order to allow a first portion thereof, corresponding to the movement device, to pass from the lowered condition to the raised condition, possibly through possible intermediate conditions, and a second portion thereof, corresponding to the containing element, to pass from the containing position to the release position, possibly through possible intermediate positions.

Some embodiments of the present invention also concern a method to store bars which provides to move, by means of the movement unit, the bars on the support plane in the direction of movement at least between a bundle feed zone and a bar delivery zone, associated with respective opposite ends of the support plane.

In accordance with one aspect of the present invention, the method provides to store the bars in a plurality of containing and translation units disposed adjacent to each other with respect to the direction of movement. Each containing and translation unit provides that:

at least two containing elements of the containing and translation unit, distanced and aligned in a longitudinal direction, transverse to the direction of movement, are moved in a coordinated manner between a containing position, in which they are positioned below the support plane and support a bundle of bars, and a release position, in which they are positioned above the support plane and release the bars onto the support plane, at least two devices to move the containing and translation unit, associated with the containing elements and aligned in the longitudinal direction in an offset position with respect to the containing elements, are moved in a coordinated manner from a lowered condition, in which they are parallel to the support plane and move the bars, to a raised condition in which they are raised in order to allow access to the respective containing elements.

ILLUSTRATION OF THE DRAWINGS

These and other aspects, characteristics and advantages of the present invention will become apparent from the following description of some embodiments, given as a non-restrictive example with reference to the attached drawings wherein:

FIG. 2 is a top plan view of an enlarged detail of FIG. 1;

FIGS. 3-4 are lateral elevation views of FIG. 2;

FIGS. 5-8 are lateral elevation views of a possible operating sequence of the functioning of the apparatus of FIG. 1;

FIGS. 9-14 are lateral elevation views of another possible operating sequence of the functioning of the apparatus of FIG. 1;

FIGS. 18-21 are lateral elevation views of a possible operating sequence of the functioning of the apparatus of FIG. 1 provided with the containing and translation units of FIGS. 15-17;

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 1:
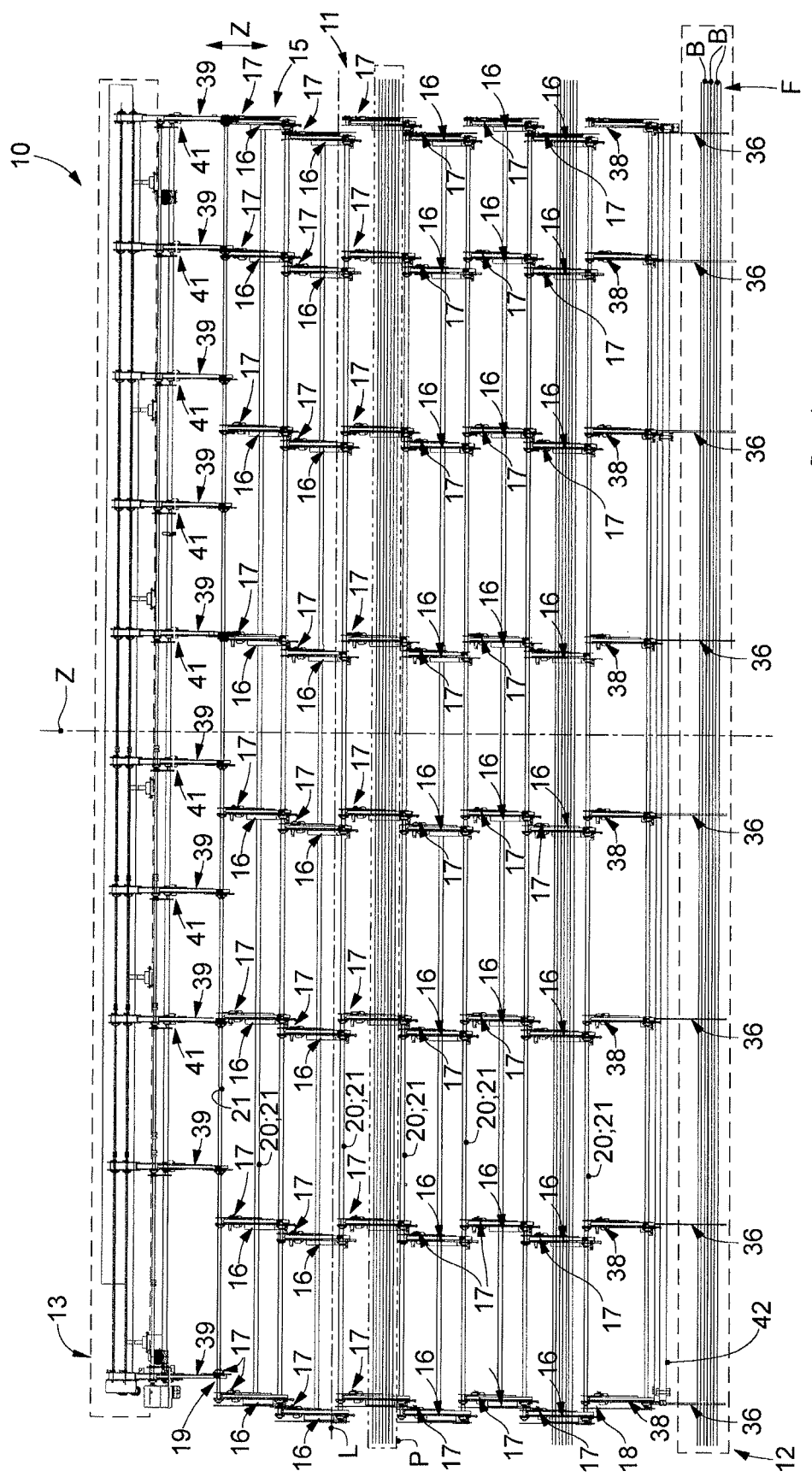
FIG. 1 is a plan view of an apparatus to store bars according to the present invention.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments of the present invention concern an apparatus to store bars B, indicated as a whole with reference number 10.

The bars B have a mainly oblong development and can have lengths even of several meters, for example up to about 30 m, and have different diameters. The bars B are typically supplied to the apparatus 10 in the form of a bundle F, that is, grouped homogeneously and tied together.

In accordance with some embodiments, the apparatus 10 to store bars B comprises a support plane 11, a bundle feed zone 12 and a bar delivery zone 13 associated with respective opposite ends 18, 19 of the support plane 11.

The support plane 11 comprises a unit 14 to move the bars B in a direction of movement Z at least from the bundle feed zone 12 to the bar delivery zone 13.

The support plane 11 can be positioned horizontally in order to prevent the bars B from moving in an unwanted manner due to gravity.

The support plane 11 comprises two lateral edges between the first end 18 and the second end 19.

The first end 18 and the second end 19 have a length substantially equal to, or greater than, the length of the bars B to be processed.

The bars B, in fact, are loaded onto the support plane 11, according to the modes described below, substantially parallel to the longitudinal development of the first end 18 and of the second end 19.

In particular, the bars B are loaded onto the support plane 11 in correspondence with the bundle feed zone 12 and are evacuated from the support plane 11 in correspondence with the bar delivery zone 13.

The bars B unloaded onto the support plane 11, thanks to the presence of the movement unit 14, can be uniformly distributed on the latter preventing them from overlapping or becoming entangled, as well as homogeneously ordered according to at least one of their characteristics into dedicated collection zones.

In accordance with one aspect of the present invention, the apparatus 10 comprises a plurality of containing and translation units 15 disposed adjacent to each other with respect to the direction of movement Z.

In the case shown in the drawings, the number of containing and translation units 15 is six, although a different number, for example higher or lower, is not excluded.

In accordance with some embodiments, each containing and translation unit 15 comprises at least two containing elements 16 distanced and aligned in a longitudinal direction L, transverse to the direction of movement Z, coordinated with each other and selectively movable in order to pass at least from one containing position, in which they are positioned below the support plane 11 and are suitable to support a respective bundle of bars B, to at least one release position, in which they are positioned above the support plane 11 in order to release the bars B onto the support plane 11.

Each containing and translation unit 15 also comprises at least two movement devices 17 positioned in correspondence with the containing elements 16 and aligned in the longitudinal direction L, coordinated with each other in order to pass at least from one lowered condition, in which they are parallel to the support plane 11 and allow the movement of the bars B, to at least one raised condition in which they are raised in order to allow access to the respective containing elements 16.

In accordance with some embodiments, shown in FIGS. 2-14, the movement devices 17 are distinct and autonomous components with respect to the respective containing elements 16, wherein the movement devices 17 are mobile independently of the respective containing elements 16 in order to independently pass respectively from the lowered condition to the raised condition and from the containing position to the release position, possibly through respective intermediate conditions and positions.

In accordance with some embodiments, shown in FIG. 1, each movement device 17 is positioned in an offset configuration with respect to the respective containing element 16. In particular, each movement device 17 is offset in the longitudinal direction L with respect to the respective containing element 16 so as to prevent possible reciprocal interferences during their reciprocally independent movement.

In accordance with some embodiments, shown in FIGS. 2-4, each containing and translation unit 15 comprises a first transmission shaft 20 and a second transmission shaft 21, both parallel to the longitudinal direction L and with which the movement devices 17 and the containing elements 16 are associated.

Each containing and translation unit 15 shares, with the adjacent one, on one side the first transmission shaft 20 and on the other side the second transmission shaft 21. It is understood that, only for ease of description, here and hereafter we will refer, for each containing and translation unit 15, to first 20 and second 21 transmission shaft although, as can be seen in the examples of FIGS. 3-4, by way of example the second transmission shaft 21 shared with an adjacent containing and translation unit 15 is the first transmission shaft 20 of the latter.

In accordance with some embodiments, shown in FIGS. 3-4, each movement device 17 has a first end pivoted to the first transmission shaft 20 and with respect to which the movement device 17 is suitable to rotate in order to pass from the lowered condition to the raised condition and vice versa.

Each movement device 17 has a second end, opposite the first end, positioned in correspondence with the second transmission shaft 21 and which can be selectively raised by the respective second transmission shaft 21 in order to allow access to the containing element 16.

Each containing element 16 has a pivoting portion 34, pivoted to the second transmission shaft 21, with respect to which it can rotate in order to pass from the containing position to the release position and vice versa.

Each containing element 16 is configured to rotate in the opposite sense to the sense of rotation of the respective movement device 17.

In accordance with some embodiments, shown in FIGS. 3-4 and FIGS. 6-7 and FIG. 9 and FIG. 13, each movement device 17 can be raised in rotation with respect to the support plane 11 by an angle of rotation comprised between about 1° and about 90°, and in any case sufficient to allow the rotation of the containing elements 16 in order to unload the bars onto the support plane 11, without reciprocal interferences occurring, or to allow the bars B to be unloaded from the support plane 11 into the containing elements 16.

In accordance with some embodiments, shown in FIGS. 3-14, with each containing and translation unit 15 there are associated at least one respective first actuation unit 29, configured to activate the movement devices 17 in order to move the bars B on the support plane 11, at least one respective second actuation unit 30, provided to allow the movement devices 17 to pass from the lowered condition to the raised condition and vice versa, and at least one third actuation unit 31 provided to allow the containing elements 16 to pass from the containing position to the release position and vice versa.

In accordance with some embodiments, the first actuation unit 29, the second actuation unit 30 and the third actuation unit 31 can be selectively activated/deactivated in a distinct and separate manner each from the other.

In accordance with possible embodiments, each containing and translation unit 15 can comprise respective synchronization devices associated with the first actuation unit 29 and with the second actuation unit 30 in order to respectively guarantee a uniform and parallel translation of the bars B in the direction of movement Z, and to guarantee an angularly uniform and simultaneous raising/lowering of the movement devices 17.

In accordance with possible embodiments, each containing and translation unit 15 can comprise other synchronization devices associated with the third actuation unit 31 to simultaneously move the containing elements 16.

According to possible solutions of the invention, the actuation units 29, 30, 31 can comprise at least one of either a jack, a linear actuator, sliding guides, chain mechanisms, rack or worm screw mechanisms, or suchlike.

In accordance with some embodiments, the first actuation unit 29 comprises a drive device 27 and a transmission device 28, for example of the chain type.

The transmission device 28 is configured to transmit the motion generated by the drive device 27 to the first transmission shaft 20 in order to activate, in a coordinated and simultaneous manner, the movement devices 17.

The transmission device 28 is associated on one side with the first transmission shaft 20 and on the other side with an auxiliary shaft 23 parallel to the first transmission shaft 20 and connected to the movement devices 17 of a same containing and translation unit 15.

In accordance with some embodiments, the second actuation unit 30 comprises a linear actuator which has an operating end associated with the auxiliary shaft 23 in order to raise/lower the movement devices 17.

In accordance with some embodiments, the third actuation unit 31 comprises a chain mechanism 24 connected with respect to a first end to the second transmission shaft 21 and with respect to a second end opposite the first end to a motor shaft 45 rotated by at least one motor 46. The motor shaft 45 is parallel to the second transmission shaft 21 and can be advantageously positioned below it.

In accordance with possible embodiments, each movement device 17 can be moved individually and autonomously with respect to the others. For this purpose, with each movement device 17 of a same containing and translation unit 15 there can be associated a respective first actuation unit 29 and a respective second actuation unit 30.

In accordance with possible embodiments, each containing element 16 can be moved individually and autonomously with respect to the others. For this purpose, with each containing element 16 of a same containing and translation unit 15 there can be associated a respective third actuation unit 31.

Advantageously, the distinct and separate movement of each movement device 17 and of each containing element 16 allows the apparatus 10 to be very versatile and efficient. For example, if it is necessary to store and pick up bars B of a very short length, it is possible to drive only the movement devices 17 in correspondence with the bars B to be picked up/stored. In particular, the apparatus 10 can be equipped with detection devices configured to detect the presence of one of the bars B in contact with the movement devices 17.

In accordance with some embodiments, shown in FIGS. 15-22, each movement device 17, together with the respective containing element 16, constitutes a single movement body 47 mobile to allow a first portion thereof, corresponding to the movement device 17, to pass from the lowered condition to the raised condition, possibly through possible intermediate conditions, and a second portion thereof, corresponding to the containing element 16, to pass from the containing position to the release position, possibly through possible intermediate positions.

Although the movement body 47 is physically a single component as described above, hereafter we will refer, however, to the first portion, corresponding to the movement device 17, and to the second portion, corresponding to the containing element 16, both of which at a functional level continue to carry out distinct and separate, that is, different, actions.

In particular, in the raised condition, the first portion, corresponding to the movement device 17, is inclined upward, with respect to the support plane 11, by an angle of rotation that varies between about 30° and about 50°, thus allowing access to the respective containing element 16 which is still in the containing position, FIG. 18.

Figure 17:
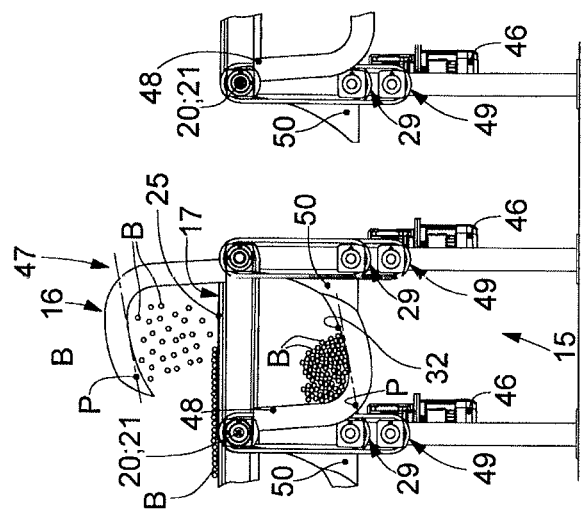
FIGS. 15-17 are lateral elevation views of a possible embodiment of containing and translation units of the apparatus described here.

In accordance with some embodiments, when the containing element 16 is in the release position, the respective movement device 17 is inclined with respect to the support plane 11 by an angle of rotation of approximately 180°, substantially finding itself in a position turned over with respect to the lowered condition and cooperating with the movement device 17 of the adjacent containing and translation unit 15 in order to allow the movement of the bars B on the support plane 11, FIG. 17 and FIG. 20.

For this purpose, it is necessary for the movement bodies 47 of adjacent containing and translation units 15 to be offset with respect to each other in the longitudinal direction L.

In accordance with some embodiments, similarly to the example described in FIGS. 2-14, each containing and translation unit 15 comprises a first transmission shaft 20 and a second transmission shaft 21 both parallel to the longitudinal direction L.

In particular, each movement body 47 has, between the first portion corresponding to the movement device 17 and the second portion corresponding to the containing element 16, an intermediate pivoting portion 48 with respect to which the movement body 47 is rotatably associated with the respective first transmission shaft 20.

In accordance with some embodiments, each containing element 16 can comprise a support 50 attached to the frame of the apparatus 10 and suitable to support, at least partly, the containing element 16 when it is in the containing position, so to prevent an excessive weight of the bars B weighing on the containing elements 16 from causing an excessive torque on the intermediate pivoting portions 48.

In accordance with some embodiments, the movement bodies 47 of a same containing and translation unit 15 move in a coordinated manner with each other, for example thanks to the aid of mechanical or electronic synchronization devices.

In accordance with some embodiments, with each containing and translation unit 15 there is associated at least one respective first actuation unit 29, configured to activate the movement devices 17 in order to move the bars B on the support plane 11, and an actuation assembly 49, independent from the actuation unit 29, provided to move the movement body 47 in rotation.

In accordance with some embodiments, the actuation assembly 49 comprises, for example, a chain mechanism connected with respect to a first end to the first transmission shaft 20 and with respect to a second end, opposite the first end, to a motor shaft by at least one motor 46. Obviously, this is just one possible embodiment of the actuation assembly 49 which, for example, can comprise a hydraulic lifting device, a worm screw or other suitable movement device.

In accordance with some embodiments, shown in FIGS. 3-4 and FIGS. 15-17, each movement device 17 comprises a transmission member 25 which can be selectively moved in a closed loop around return members 26.

The transmission member 25 defines, between the return members 26, return segments, at least one of which lies on the support plane 11 and is disposed in the direction of movement Z.

In particular, it can be provided that the return segment comprised between the return members 26 has at least one support surface, facing toward the outside and lying on the support plane 11.

Each return segment of the transmission members 25 is located in contact with one portion of the bars B, determining the distribution and movement of the bars B at least on one portion of the support plane 11.

In accordance with some embodiments, shown in FIG. 1, between two adjacent movement devices 17 of a same containing and translation unit 15 there comes to be defined an interspace in which the bars B are not supported.

In accordance with possible embodiments, the interspaces as above can all have the same size.

In accordance with other possible embodiments, the interspaces as above can have a variable size.

According to possible embodiments of the present invention, the transmission member 25 can be selected from a group comprising at least one of either a chain, a belt, or a cable.

Figure 16:
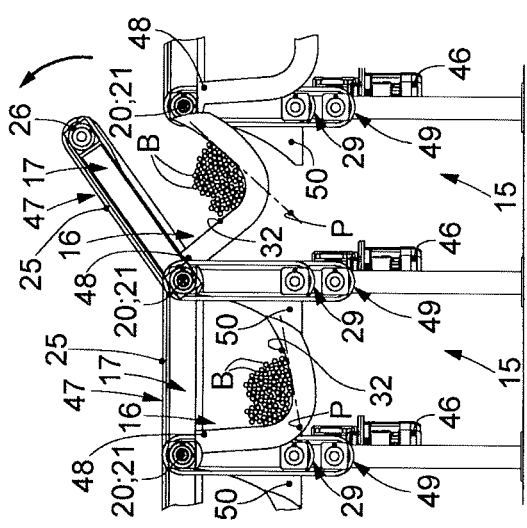
Figure 15:
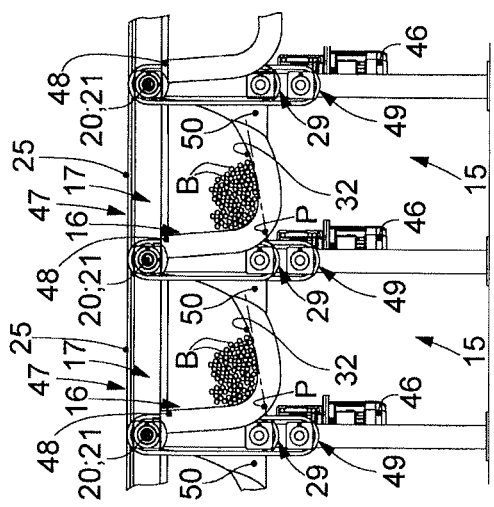

In accordance with the embodiment shown in FIGS. 3-4 and in FIGS. 15-17, the transmission members 25 comprise a chain, for example of the roller type. The choice of a roller chain, thanks to the irregularity of the support surface defined by the links that make up the chain, allows to generate vibrations on the bars B such as to induce a homogeneous distribution thereof on the support plane 11, that is, on a portion thereof.

The return members 26 can comprise at least one of either wheels, pulleys, toothed crowns, suitable to allow the transmission member 25 to be wound around them.

In accordance with possible solutions, the return members 26 comprise toothed crowns, FIG. 3, on which the links of the roller chains mesh. This embodiment guarantees that there is not a reciprocal sliding between the return members 26 and the transmission members 25.

In accordance with possible embodiments, the containing and translation units 15 are suitable to each accommodate a different type of bars B, for example of different sizes, different lengths, different types of material, or suchlike.

In accordance with some embodiments, shown for example in FIGS. 3-4 and in FIGS. 15-17, each containing element 16 has a concave conformation with concavity open upward in order to receive, in cooperation with the other containing elements 16, the bars B.

Each containing element 16 can be provided with a housing seating 32 open, during use, upward and suitable to support a portion of the bars B.

In particular, each housing seating 32 partly supports the bars B so that the bars B are supported in a discontinuous manner, but substantially for their entire length.

In accordance with some embodiments, shown in FIGS. 3-4, each housing seating 32 is substantially U-shaped.

In accordance with some embodiments, shown in FIGS. 15-17, each housing seating 32 is substantially L-shaped, provided with a terminal end slightly curved upward in order to allow to contain the bars B even in a partly rotated condition.

The containing elements 16 of a same containing and translation unit 15 are positioned at the same height so that the respective housing seatings 32 define a discontinuous housing plane P to support the stored bars B, FIG. 1.

With particular reference to FIGS. 3-4, when the containing elements 16 of a same containing and translation unit 15 are in the containing position, the housing seatings 32 are below the support plane 11 and the housing plane P is substantially parallel to the support plane 11. When the containing elements 16 of a same containing and translation unit 15 are in the release position, the housing seatings 32 are above the support plane 11 and the housing plane P is substantially inclined with respect to the support plane 11 in order to allow the bars B to be unloaded onto the support plane 11.

In accordance with some embodiments, the apparatus 10 comprises auxiliary movement devices 38, 39 positioned respectively in correspondence with the first end 18 and the second end 19. In particular, the auxiliary movement devices 38 are configured to move the bars B from the bundle feed zone 12 toward the containing and translation units 15. The movement devices 39 are configured to move the bars B from the containing and translation units 15 toward the bar delivery zone 13.

Advantageously, the auxiliary devices 38 can have an extension, in the direction of movement Z, suitable to allow the unloading of the bars B contained in the nearest containing unit 15 and to allow the unloading of the bars B therein.

In accordance with possible solutions, the auxiliary movement devices 38, 39 can have the same conformation and the same characteristics as the movement devices 17 as described above. Possibly, the auxiliary movement devices 38, 39 can be fixed, not providing containing elements 16 in the underlying position. However, it is possible to provide a lowering/raising movement thereof, in a manner similar to the movement device 17, in the event it was necessary to determine a particular inclination in order to prevent the bars B from falling from the support plane 11 in correspondence with the first end 18.

In accordance with some embodiments, the apparatus 10 comprises loading means 36 positioned in correspondence with the bundle feed zone 12 and configured to receive a bundle F of bars B, for example moved with a bridge crane, and to transfer it to the support plane 11.

Advantageously, the loading means 36 are disposed in correspondence with the first end 18 equally spaced in the longitudinal direction L.

Each loading mean 36 comprises a receiving seating 37 suitable to support the bars B positioned for example with a bridge crane or other known pick-up and movement devices. The receiving seatings 37 define a discontinuous receiving plane to support the bars B to be positioned on the support plane 11.

The loading means 36 are mobile in rotation between a receiving position outside the support plane 11 in which they are suitable to receive the bars B, to an unloading position located above the support plane 11 in which they are suitable to unload the bars onto the support plane 11.

In accordance with some embodiments, the loading means 36 can be installed on a common rotation shaft 42 which is selectively rotatable to simultaneously take the loading means 36 between the receiving position and the unloading position. For this purpose, the loading means 36 can comprise known lifting devices 40, selected from a group comprising at least one of either a jack, a linear actuator, sliding guides, chain mechanisms, rack or worm screw mechanisms, or suchlike.

In accordance with possible embodiments, not shown, the apparatus 10 can comprise an automated device, possibly robotized, positioned in correspondence with the loading means 36 and configured to release the bundle F of bars B, positioned on the loading means 36, from the metal cables that clamp the bars B to define the bundle F.

In accordance with some embodiments, the apparatus 10 comprises handling devices 41 configured to pick up, on each occasion, a bar B from the support plane 11 and deliver it to the bar delivery zone 13.

The handling devices 41 comprise a plurality of transfer arms provided with holding elements, for example magnetic, configured to magnetically hold one of the bars B during its transfer between the support plane 11 and the bar delivery zone 13.

In accordance with one possible solution of the present invention, the bar delivery zone 13 defines a delivery plane inclined downward with respect to the support plane 11. In this way, when the bar B is delivered to the bar delivery zone 13, it is unloaded, due to gravity, toward a user machine downstream, for example a transfer machine or directly a cutting machine.

Figure 22:
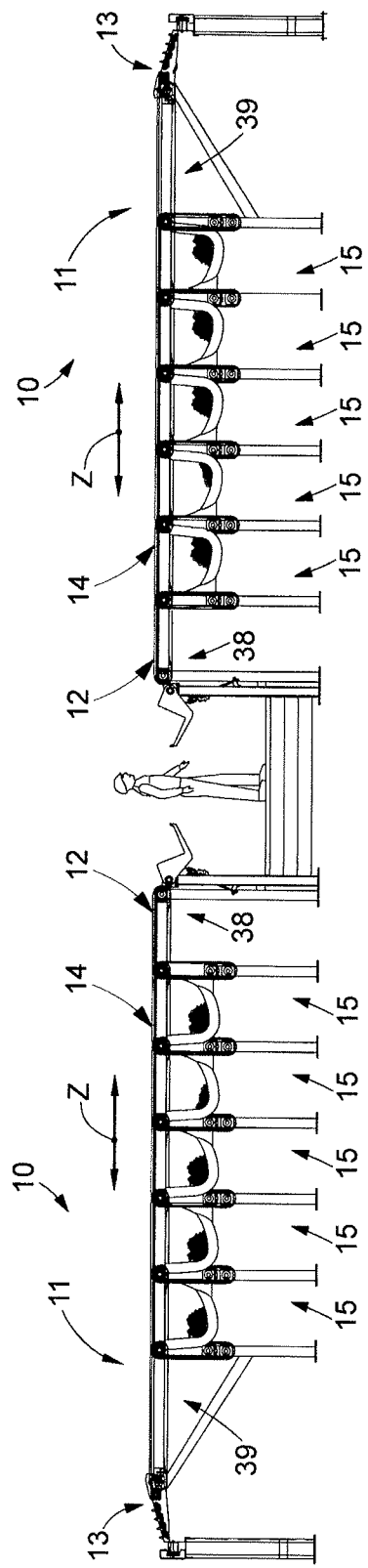
FIG. 22 is a lateral view of a possible operating disposition of two apparatuses to store bars in accordance with some embodiments.

In accordance with some embodiments, shown in FIG. 22, it is possible to provide to install two or more apparatuses 10, for example, disposed facing each other with respect to the respective bar feed zones 12 and having respective directions of movement Z parallel to each other.

Embodiments described here also concern a method to store bars B which provides to move by means of a movement unit 14 the bars B on the support plane 11 in the direction of movement Z at least between a bundle feed zone 12 and a bar delivery zone 13, associated respectively with opposite ends 18, 19 of the support plane 11.

In accordance with one aspect of the present invention, the method provides to store the bars B in a plurality of containing and translation units 15 disposed adjacent to each other with respect to the direction of movement Z. Each containing and translation unit 15 provides that:

at least two containing elements 16 of the containing and translation unit 15, distanced and aligned in the longitudinal direction L, transverse to the direction of movement Z, are moved in a coordinated manner between at least one containing position, in which they are positioned below the support plane 11 and they support a bundle of bars B, and at least one release position, in which they are positioned above the support plane 11 and they release the bars B onto the support plane 11, at least two movement devices 17 of the containing and translation unit 15, associated with the containing elements 16 and aligned in the longitudinal direction L in an offset position with respect to the containing elements 16, are moved in a coordinated manner from at least one lowered condition, in which they are parallel to the support plane 11 and they move the bars B, to at least one raised condition in which they are raised in order to allow access to the respective containing elements 16.

With reference to FIGS. 5-8, a possible operating sequence of the functioning of the apparatus of FIG. 1 is shown, in which the movement devices 17 and the respective containing elements 16 are distinct and separate from each other.

When it is necessary to store a bundle F of bars B, the bundle F of bars B is deposited, for example with the aid of a bridge crane 43, in the receiving seatings 37 of the loading means 36 which are in the receiving position, FIG. 5.

Once the bundle F of bars B has been positioned, an operator provides to release the bundle F from the metal cables that clamp the bars B to define the bundle F. Possibly, in the event the apparatus 10 is equipped with an automated cutting device, it is provided that such automated cutting device provides to untie the bundle F and make the bars B available.

Subsequently, the loading means 36 are moved in rotation between the receiving position, FIG. 5, and the unloading position, FIG. 6, in correspondence with which the bars B slide from the receiving seatings 37 toward the support plane 11. In particular, the bars B are unloaded in correspondence with the auxiliary movement means 38 that provide to move them in the direction of movement Z.

While the bars B are moved by the loading means 36, as described above, the movement devices 17 of the containing and translation unit 15 used to store the bars B that have just been loaded onto the support plane 11, are moved from the lowered condition, FIG. 5, to the raised condition, FIG. 6.

Subsequently, the movement means 17 of the containing and translation units 15 positioned upstream of the containing and translation unit 15 used for the storage are driven. The movement means 17 uniformly distribute the bars B on the support plane 11 and move them in the direction of movement Z until they cause them to fall into the containing elements 16, FIG. 7.

Once the movement of the bars B has ended, the bars B are positioned inside the containing elements 16, in particular in the housing seatings 32 of the containing elements 16, as they wait to be moved in order to be used at a later stage. Once such movement has ended, the movement devices 17 of the containing and translation unit 15 used to store the bars B are moved from the raised condition, FIG. 7, to the lowered condition, FIG. 8.

With reference to FIGS. 9-14, another possible operating sequence of the functioning of the apparatus of FIG. 1 is shown, in which the movement devices 17 and the respective containing elements 16 are distinct and separate from each other.

Figure 9:
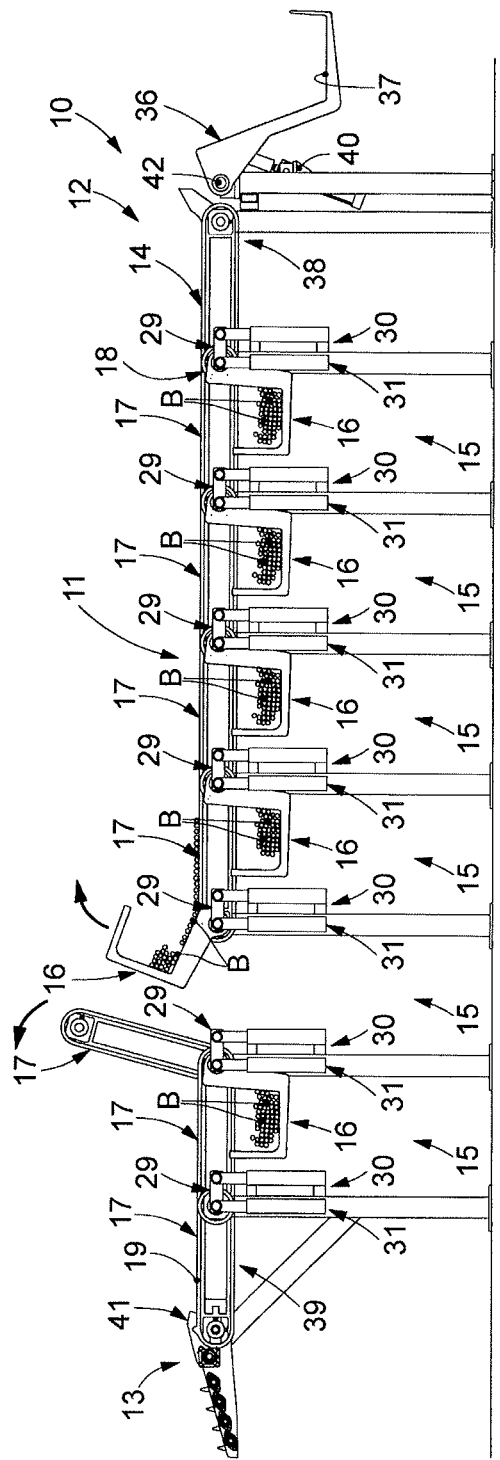

When a user machine located downstream of the apparatus 10 requires a determinate number of bars B positioned in a specific containing and translation unit 15 to be fed, the corresponding movement devices 17 are moved from the lowered condition to the raised condition, FIG. 9, so as to make the access to the respective containing elements 16 available. The containing elements 16 are taken into the release condition as above, in order to allow the bars B contained therein to be unloaded onto the support plane 11, in particular on the part of the plane upstream of the containing and translation unit 15. At the same time, FIG. 9, the movement means 17 of the containing and translation units 15 upstream of the containing and translation unit 15 used for the picking up, are driven in order to move the bars B in a direction opposite the direction of movement Z so as to uniformly spread the bars B and arrange them on the support plane 11 orthogonally to the direction of movement Z.

Figure 10:
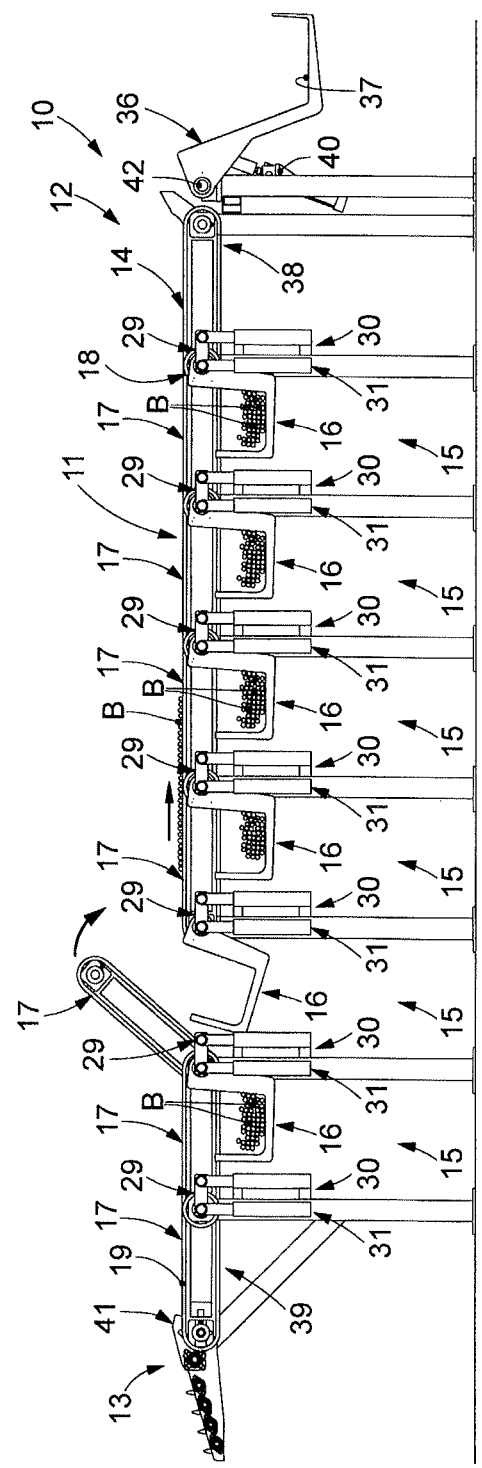

Once the unloading of the bars B onto the support plane 11 has ended, the containing elements 16 are taken from the release condition to the containing condition, and the respective movement means 17 are taken from the raised condition to the lowered condition, FIG. 10.

Subsequently, the movement unit 14, that is, altogether the movement devices 17 of the containing and translation units 15, moves the bars B toward the bar delivery zone 13 where they are picked up in order to be sent to the user machine located downstream, for example to a cutting machine, not shown, FIG. 11.

The remaining bars B not sent to the user machine can be repositioned in the corresponding containing and translation unit 15 from which they have just been picked up.

For this purpose, the remaining bars B are moved backwards on the support plane 11 in order to go past the containing and translation unit 15 used to store the remaining bars B, FIG. 12.

Subsequently, the respective movement means 17 corresponding to the containing elements 16 which will receive the remaining bars B are taken from the lowered condition to the raised condition, FIG. 13, and the movement means 17 of the containing and translation units 15 positioned upstream of the containing and translation unit 15 used to store the remaining bars B are activated so as to move the remaining bars B on the support plane 11 in the direction of movement Z until they cause them to fall into the containing elements 16 which are in the containing position.

Once the unloading of the remaining bars B into the containing elements 16 has ended, the respective movement means 17 are taken from the raised condition to the lowered condition, FIG. 14.

With reference to FIGS. 18-19, a possible operating sequence to store a bundle F of bars B in the apparatus of FIG. 1 is shown, wherein the movement devices 17 and the respective containing elements 16 define respective movement bodies 47, as shown in FIGS. 15-17.

The bundle F of bars B is deposited, for example with the aid of a bridge crane, not shown, in the receiving seatings 37 of the loading means 36 which are first in the receiving position and then in the unloading position, releasing the bars B onto the support plane 11.

The bars B are moved by means of the movement devices 17 of the containing and translation units 15 upstream of the containing and translation unit 15 used for the storage toward the latter. In particular, the first portion corresponding to the movement device 17 is inclined upward, with respect to the support plane 11, by an angle of rotation of about 45° allowing access to the respective containing element 16 which, although rotated, is still in the containing position in order to receive the bars B, FIG. 18.

Once the movement of the bars B has ended, the bars B are positioned in the housing seatings 32 of the containing elements 16, as they wait to be moved in order to be used at a later stage. Once the step of storing the bars B has been completed, the movement devices 17 of the containing and translation unit 15 used to store the bars B are moved from the raised condition to the lowered condition, FIG. 19.

With reference to FIGS. 20-21, a possible operating sequence for feeding a determinate number of bars B, contained in a containing and translation unit 15, to the support plane 11 is shown.

The movement body 47 of the containing and translation unit 15, containing the bars B to be processed, is rotated so that the containing elements 16 are in the release position and the respective movement devices 17 are turned over by 180° with respect to the support plane 11 being parallel and coplanar therewith. Such movement devices 17 cooperate with the movement devices 17 of the containing and translation units 15 located downstream in order to allow the movement of the bars B on the support plane 11 toward the bar delivery zone 13, FIG. 20.

Once the movement of the bars B has ended, the movement body 47 rotates in the opposite sense until the respective containing elements 16 are returned to the containing position and the respective movement devices 17 are taken into the lowered condition.

It is clear that modifications and/or additions of parts or steps may be made to the apparatus and method to store bars as described heretofore, without departing from the field and scope of the present invention.

It is also clear that, although the present invention has been described with reference to some specific examples, a person of skill in the art shall certainly be able to achieve many other equivalent forms of apparatus and method to store bars, having the characteristics as set forth in the claims and hence all coming within the field of protection defined thereby.

In the following claims, the sole purpose of the references in brackets is to facilitate reading and they must not be considered as restrictive factors with regard to the field of protection claimed in the specific claims.

The invention claimed is:

1. Apparatus to store bars, supplied to said apparatus in the form of a bundle, said apparatus comprising a support plane, a bundle feed zone and a bar delivery zone associated with respective opposite ends of said support plane, wherein said support plane comprises a movement unit to move said bars in a direction of movement at least from said bundle feed zone to said bar delivery zone, characterized in that it comprises a plurality of containing and translation units disposed adjacent to each other with respect to said direction of movement, wherein each containing and translation unit comprises:
   at least two containing elements distanced and aligned in a longitudinal direction, transverse to said direction of movement, coordinated with each other and selectively movable in order to pass at least from one containing position, in which they are positioned below said support plane and are suitable to support a bundle of bars, to at least one release position, in which they are positioned above said support plane in order to release said bars onto said support plane,
   at least two movement devices associated with said containing elements and aligned in said longitudinal direction, being coordinated with each other in order to pass at least from one lowered condition, in which they are substantially parallel to said support plane and allow the movement of said bars, to at least one raised condition in which they are raised in order to allow access to the respective containing elements;
   wherein said movement devices are separate from the respective containing elements, and wherein said movement devices are mobile independently of said respective containing elements in order to independently pass respectively from said lowered condition to said raised condition, and from said containing position to said release position.

2. Apparatus as in claim 1, characterized in that each containing and translation unit comprises a first transmission shaft and a second transmission shaft parallel to said longitudinal direction and facing each other, with which said movement devices and said containing elements are respectively associated.

3. Apparatus as in claim 2, characterized in that each movement device has a first end pivoted to said first transmission shaft and with respect to which said movement device is suitable to rotate in order to pass from said lowered condition to said raised condition and vice versa, and in that each respective containing element has a pivoting portion pivoted to said second transmission shaft and with respect to which it is configured to rotate, in the opposite direction to the direction of rotation of said movement device, from said containing position to said release position and vice versa.

4. Apparatus as in claim 1, characterized in that with each containing and translation unit are associated at least one respective first actuation unit, configured to activate said movement devices to move said bars on said support plane, at least one respective second actuation unit, provided to allow the passage of said movement devices from said lowered condition to said raised condition and vice versa, and at least one third actuation unit provided to allow the passage of said containing elements from said containing position to said release position and vice versa.

5. Apparatus as in claim 4, characterized in that said at least one first actuation unit, second actuation unit and third actuation unit can be selectively activated/deactivated each independently of each other.

6. Apparatus as in claim 1, characterized in that each movement device, together with the respective containing element, constitutes a single movement body mobile in order to allow a first portion thereof, corresponding to the movement device, to pass from said lowered condition to said raised condition, possibly-through possible-intermediate conditions, and a second portion thereof, corresponding to the containing element, to pass from said containing position to said release position, possibly-through possible intermediate positions.

7. Apparatus as in claim 6, characterized in that each containing and translation unit comprises at least one first transmission shaft parallel to said longitudinal direction, and in that said movement body has, between said first portion corresponding to the movement device and said second portion corresponding to the containing element, an intermediate pivoting portion with respect to which said movement body is rotatably associated.

8. Apparatus as in claim 6, characterized in that with each containing and translation unit are associated at least one respective first actuation unit, configured to activate said movement devices in order to move said bars on said support plane, and an actuation assembly, independent of said actuation unit, provided to move said movement body in rotation.

9. Apparatus as in claim 1, characterized in that each containing element comprises a housing seating open upward, during use, and suitable to support a segment of the bars, in which the containing elements of a same containing and translation unit are positioned at the same height so that the respective housing seatings define a discontinuous housing plane to support said stored bars.

10. Apparatus as in claim 9, characterized in that when the containing elements of a same containing and translation unit are in said containing position, said housing seatings are below said support plane and said housing plane is substantially parallel to said support plane, when the containing elements of a same containing and translation unit are in said release position, the housing seatings are above the support plane and the housing plane is substantially inclined and incident with respect to the support plane in order to allow the unloading of said bars onto the support plane.

11. Apparatus as in claim 1, characterized in that it comprises a loader positioned in correspondence with said bundle feed zone and configured to receive a bundle of and to transfer said bars onto said support plane.

12. Apparatus as in claim 1, characterized in that at least said movement devices of said containing and translation units, in the lowered condition, define said movement unit.

13. Method to store bars which provides to move by a movement unit said bars on a support plane in a direction of movement at least between a bundle feed zone and a bar delivery zone, associated with opposite ends of said support plane, characterized in that it provides to store said bars in a plurality of containing and translation units disposed adjacent to each other with respect to said direction of movement, wherein each containing and translation unit provides that:
- at least two containing elements, distanced and aligned in a longitudinal direction, transverse to said direction of movement, are moved in a coordinated manner between at least one containing position, in which they are positioned below said support plane and support a bundle of bars, and at least one release position, in which they are positioned above said support plane and release said onto said support plane,
- at least two movement devices associated with said containing elements and aligned in said longitudinal direction are moved in a coordinated manner from at least one lowered condition, in which they are parallel to said support plane and move said bars, to at least one raised condition in which they are raised in order to allow access to the respective containing elements;
- wherein said movement devices are separate from the respective containing elements, and wherein said movement devices are mobile independently of said respective containing elements in order to independently pass respectively from said lowered condition to said raised condition, and from said containing position to said release position.

* * * * *